Sept. 7, 1965    P. HOLD ETAL    3,204,533
MACHINE TOOL SERVO SYSTEM
Filed April 11, 1963    2 Sheets-Sheet 1

INVENTORS
Peter Hold
James R. Mitchell
BY Spencer, Rockwell, Bartholow
ATTORNEYS

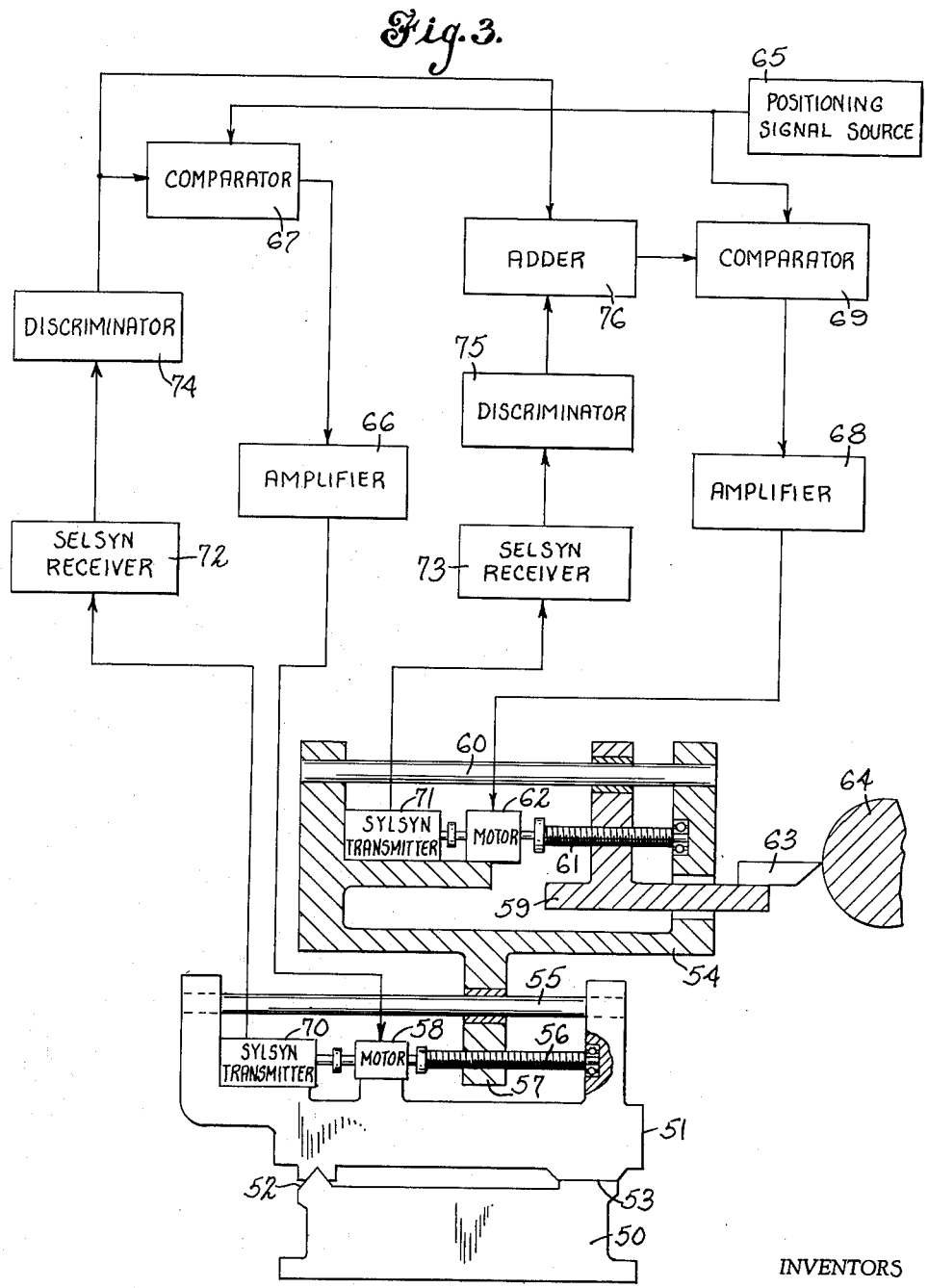

United States Patent Office 3,204,533
Patented Sept. 7, 1965

3,204,533
MACHINE TOOL SERVO SYSTEM
Peter Hold, Milford, and James R. Mitchell, Seymour, Conn., assignors to Farrel Corporation, Ansonia, Conn.
Filed Apr. 11, 1963, Ser. No. 272,260
10 Claims. (Cl. 90—13.5)

This invention relates to servo-systems and more particularly relates to servo-systems utilized with machine tools of a type in which a work function is performed on a workpiece in accordance with the contour of a template or a programmed tool positioning signal.

In various machine tools it is common practice to have a work function performed on a workpiece in accordance with the outline or contour of a master template. In a conventional system, well known in the art, in which a tracing element contacts a template or other guide means, motion of the tracing element imparted thereto by the template or movement along the template generates a signal in a transducing or sensing unit attached to or including the tracing element. Any motions transmitted to the tracing element by the template or other guiding means generates a signal proportional to motion of the tracing element, which, through appropriate control means, causes a motor to operate in a proper direction to minimize the signal generated by the sensing unit and simultaneously move a tool in accordance with the outline of a template.

Ideally, a slide or other member carrying a tool moves in precise unison with the tracing element to cut or grind a workpiece in accordance with the outline of the template. However, in practice there is always an error between the shape of the template which the tracing element follows and the shape produced upon the workpiece by the tool. The magnitude of this error depends on such factors as the speed under which the elements of the system works, and the mechanical and electrical characteristics of the overall system. When the tracing element and the tool are caused to operate at relatively high speeds, the consequent error may be substantial, and even at moderate speed the error may be significant where a high degree of reproducibility between the work and the template is required. For example, if the tool and the sensing unit including the tracing element are carried by the same member, then the error in the workpiece will constitute in magnitude the lag in response which exists at the sensing unit, further dependent on the characteristics of the control means and the motor driving the tool carrying member. In servo-systems of the type described, the displacement signal generated by the tracing element and sensing unit may be considered an error signal and control means responsive to this error signal energize a motor which drives the working tool to a position to minimize or nullify the error signal.

In view of the foregoing inherent errors in machine tool control systems of the type described, this invention provides a machine tool servo-system having means to substantially decrease the error in response of a work tool to displacement of a tracing element. The invention is further adaptable for utilization in a machine tool control and positioning system wherein the working tool is caused to move in relation to a workpiece in accordance with a tool positioning signal recorded on a suitable media, such as perforated or magnetic tape or punched cards.

Accordingly, an object of this invention is to provide a new and improved machine tool servo-system.

Another object of this invention is to provide a new and improved machine tool servo-system wherein a tool is rapidly and accurately caused to move in relation to a workpiece in accordance with the outline or contour of a template or a programmed outline or contour.

Briefly stated, the invention, in one form thereof, provides a machine tool system comprising a first member movable with respect to a workpiece and a second member movable on the first member with respect to the workpiece. The second member is arranged to carry a tool adapted to perform a work function on the workpiece. Separate servo-drive means are provided for each member which are simultaneously responsive to a tool positioning or error signal. In this arrangement, the second member and the drive means therefor have a significantly smaller operating range with respect to the first member and the overall system attains an increased response and decreased error with no sacrifice in system stability.

The features of the invention which are believed to be novel are pointed out with particularity and distinctly claimed in the claims appended to and forming part of this specification. However, the invention, both as to its operation and organization, together with further objects and advantages thereof may best be appreciated by reference to the following detailed description taken in connection with the accompanying drawings, wherein:

FIG. 3 illustrates, in a similar manner as FIG. 1, a machine tool servo-sytsem wherein a workpiece is shaped in accordance with a programmed contour or outline defined by a tool positioning signal.

Figure 1:
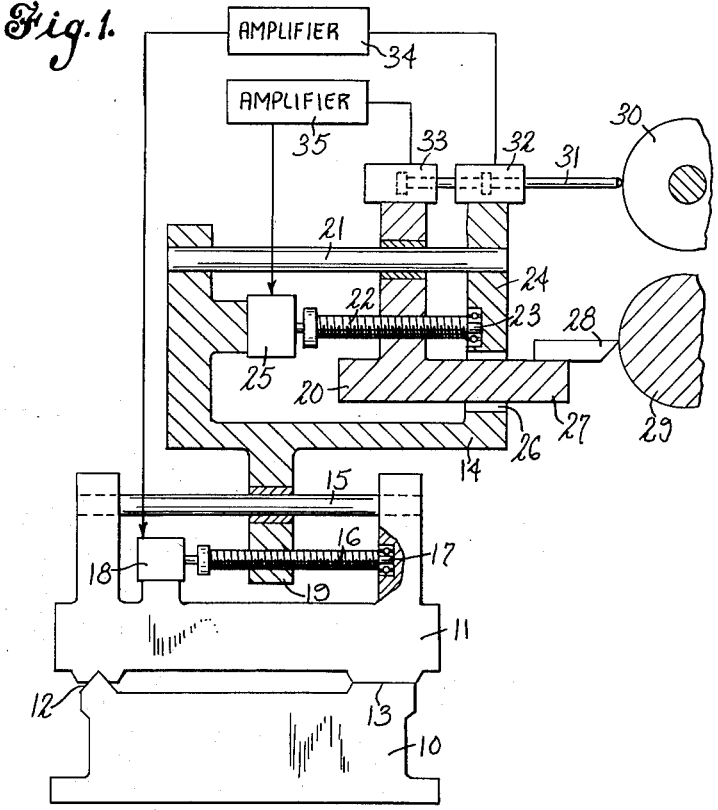
FIG. 1 illustrates, partly in section and partly in block form, a machine total servo-system embodying the invention wherein a workpiece is shaped in accordance with a master template.

To illustrate one preferred embodiment of the invention, a tracing apparatus including a tool positioning servo-system is shown which comprises a base member 10 having a carriage 11 movable thereon on ways 12 and 13 in a direction perpendicular to the drawing. Drive means, not shown, are provided for moving carriage 11 on base member 10. Carried on carriage member 11 is a first movable member or slide 14. Slide 14 is slidable on way guides 15, only one shown, supported at opposite ends thereof by carriage 11. Means is provided for driving member 14 on carriage 11. A feed screw 16 journaled at one end 17 thereof in carriage member 11 and connected at the other end thereof to a drive motor 18 and mounted on carriage member 11, threadably extend through a portion 19 of member 14. Upon rotation of feed screw 16 by motor 18, slide 14 is moved along way guides 15 toward or away from a workpiece.

In accordance with the invention, slide 14 carries a second movable member or slide 20 thereon which is movable with respect to slide 14 and carriage 11. Slide 20 is slidable upon way guides 21, only one shown, carried by slide 14. Slide member 20 threadably receives therethrough a feed screw 22 journaled at one end 23 thereof in upright portion 24 of slide member 14 and connected at the other end thereof to a drive motor 25. When feed screw 22 is rotated by motor 25, slide member 20 will advance or retreat on guides 21 dependent upon the direction of rotation of feed screw 22.

An aperture or recess 26 is defined in slide member 14 and a tool holding portion 27 of slide 20 extends therethrough. A tool 28, illustrated as a cutting tool, is mounted on tool carrying portion 27. It is to be understood that the work tool may take other forms for example, it may be a grinding wheel or even an electrical cutting element. The tool 28, as illustrated, is arranged to perform a cutting operation on a workpiece generally indicated by reference numeral 29.

The workpiece 29, as illustrated, is to be contoured in proportion to the shape of a template 30. For purposes of illustration only, the workpiece 29 is illustrated as a mill or calender roll which may be rotated and acted upon by tool 29 as carriage 11 moves along base 10. A tracing element, illustrated as a rod 31, is operatively connected to sensing elements 32 and 33 carried by slides 14 and 20, respectively. Sensing elements 32 and 33, for example, may be linear differential transformers which generate a signal indicative of displacement of a movable core member, as hereinafter explained.

Sensing element 32 upon displacement of tracer rod 31 from a neutral position will generate a signal indicative of the position of tracing rod 31 or the degree of displacement of tracing rod 31 from a neutral position, which signal is applied to an amplifier 34. The output signal of amplifier 34 is applied to motor 18, causing motor 18 to drive feed screw 16 and move slide member 14 in a direction to minimize or eliminate the signal generated by sensing element 32. It is well known to those skilled in the art that in such a positioning or follower system as thus far described there are inherent time delays in slide 14 following movement of tracing rod 31.

Sensing element 33 generates a signal upon displacement of tracing element 31 which is proportional to the magnitude of the displacement. The displacement signal generated by sensing element 33 is applied to an amplifier 35 where it is amplified and applied to motor 25 to drive motor 25 and feed screw 22 in a direction which minimizes or eliminates the signal output of sensing element 33.

Any displacement of tracing rod 31 simultaneously causes generation of displacement or position error signals in sensing elements 32 and 33. It will be understood that the signals generated by sensing elements 32 and 33 are actually indicative of tracer position or distance from a neutral position. Therefore, slides 14 and 20 are actuated by motors 18 and 25, respectively, to minimize the displacement signals generated in sensing units 32 and 33. The provision of slide 20, together with sensing element 33 and motor 25, provides a much faster and accurate response in moving tool 28 to a position which minimizes the displacement signal generated by sensing element 33, and sensing element 32. The net error at the tool 28 in following the contour of the template 30 is substantially less than it would be with the conventional system which does not utilize slide 20, sensing element 33 and motor 25. The reduction in error at the work tool may be demonstrated mathematically as follows:

Let
$$V_1 = G_1 E_1 \quad (1)$$
and
$$V_2 = G_2 E_2 \quad (2)$$

where $V_1$=velocity of system I, comprising sensing element 33, amplifier 35, and motor 25 driving feed screw 22.
$G_1$=gain of system I
$E_1$=error of system I
$V_2$=velocity of system II, comprising sensing element 32, amplifier 34 and motor 18 driving feed screw 16
$G_2$=gain of system II
$E_2$=error of system II differentiating (1) with respect to to time $$\frac{dV_1}{dt} = G_1 \frac{dE_1}{dt} \quad (3)$$

Since $E_1$ is a distance error, its differential with respect to time is the velocity required of system II to overcome the error in time $dt$, therefore from (1), (2) and (3)

$$V_2 = \frac{dE_1}{dt} = \frac{1}{G_1} \frac{dV_1}{dt} = G_2 E_2 \quad (4)$$

and $$E_2 = \frac{1}{G_1} \cdot \frac{1}{G_2} \frac{dV_1}{dt} \quad (5)$$

where $E_2$ expresses the overall error of both systems.

It is thus readily apparent that the error of the overall system or the error in position of tool 28 is reduced by a factor equal to the gain of the servo system comprising sensing element 32, amplifier 34 and motor 25.

Figure 2:
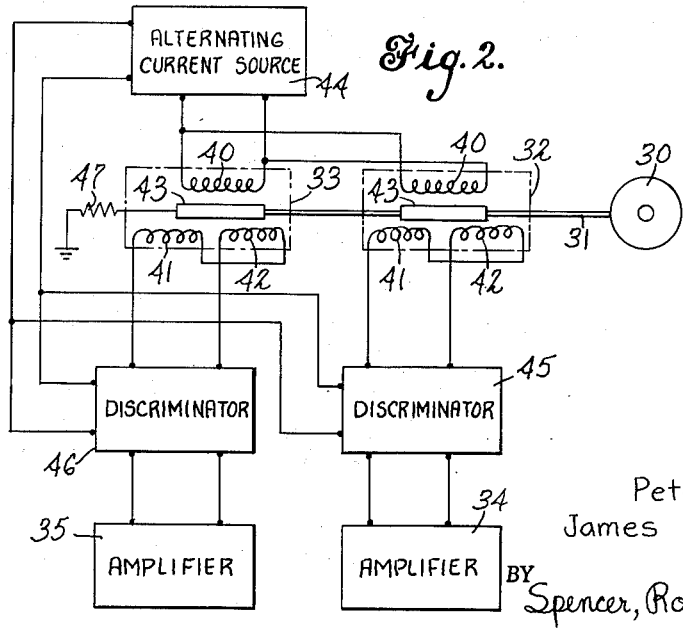
FIG. 2 illustrates, partly in schematic and partly in block form, a position sensing unit which may be utilized in the apparatus of FIG. 1.

The sensing elements 32 and 33, for example, may be linear differential transformers of a type well known to those skilled in the art. Sensing units of the type herein described are made by Bourn, Inc., Riverside, California. An exemplary arrangement of such sensing elements is shown in FIG. 2. Each of the sensing elements 32 and 33 comprises a linear differential transformer having a primary winding 40, a pair of secondary windings 41 and 42 connected in series opposition, and a movable magnetic core 43. The secondary windings 41 and 42 have voltages induced therein which vary inversely with movement of the core 43. The difference of the voltages generated in windings 41 and 42 is indicative in magnitude and in phase of the physical displacement of core 43 from a neutral or null position. As the core 43 is moved in a direction from the null position, the resultant output voltage of the secondary windings will increase while maintaining a certain phase difference between a primary voltage applied to primary winding 40 from an alternating current signal source 44. As core 43 is moved in the opposite direction from a null position the voltage will also increase, but will reverse phase by 180°. A resultant displacement or position signal may be derived from a discriminator which compares the magnitude and phase of the output voltage from windings 41 and 42 against a reference voltage, illustrated as derived from alternating current source 44, of known amplitude and phase.

The output of discriminator 45 is applied to amplifier 34 which causes motor 18 to drive feed screw 16 and position slide 14 in accordance with the magnitude and polarity of the signal output of discriminator 45. In a like manner, the secondary windings of sensing element 33 will furnish a displacement signal to discriminator 46, which in turn applies a signal to amplifier 35 which causes motor 25 to drive feed screw 22 to correctly position slide 20 and tool 28 with respect to a workpiece.

It will be noted that the cores 43 of both of the sensing elements are coupled, and will have identical absolute motion imparted thereto by movement of tracer rod 31. Therefore, displacement signals generated by the sensing elements appear simultaneously. However, since the windings of the sensing elements are stationary with respect to the slides on which they are mounted, unless slides 14 and 20 move with the same velocity, with respect to base 10, the movement of the cores 43 of each of the sensing elements 32 and 33, with respect to their windings, will differ. Therefore, the displacement of the core 43 of sensing element 33 will be indicative of the sum of the position errors of slides 14 and 20, while the displacement of the core 43 of sensing element 32 is indicative of only the position error of slide 14. Hence, slide 20, carrying tool 28, will be driven by motor 25 to eliminate the sensed position error of both slides 14 and 20 while slide 14 is being driven by motor 18 to correct only its own sensed position errors. This provides a much faster and accurate response in correcting for an observed displacement error without introducing a tendency toward instability in the machine tool drive system, and the net position error at the tool 28 is substantially reduced. This is due to the fact that the displacement signal from sensing element 33 and the resulting corrective action of motor 25 occurs in a much lesser operating range than required by sensing element 32 and motor 18 inasmuch as slide 20 is movable with respect to both slide 14 and carriage 11.

The cores 43, together with tracer rod 31 connected thereto may be biased toward a template or other surface to be engaged by means such as a spring 47. It is to be understood that other sensing units may be utilized. Moreover, the drives for slides 14 and 20 may take other forms such as hydraulic motors actuated by a hydraulic or electro-hydraulic sensing and amplifying means. Moreover, the tracing rod 31 and sensing units 32 and 33 need not be mounted on the second slide 20, but may be mounted on a parallel system divorced in distance from slides 14 and 20.

The invention is further applicable to a machine tool system wherein a tool operates on a workpiece in accordance with a programmed position signal which may be stored on a media such as perforated tape, punched cards, or magnetic tape. Such a system which utilizes essentially the same mechanical elements as illustrated in FIG. 1 is shown in FIG. 3, and comprises a base member 50 having a carriage 51 movable thereon on ways 52 and 53. Carriage 51 is movable on base 50, by driving means not shown, in a direction normal to the plane of the drawing and carries thereon a first slide member 54 movable on way guides 55, only one shown. Slide member 54 is driven by a feed screw 56 threadably received through a portion 57 thereof. Feed screw 56 is driven by a motor 58 mounted on carriage 51. Slide member 54 carries a second slide member 59 movable thereon on way guides 60, only one shown. Slide member 59 threadably receives therethrough a feed screw 61 driven by a motor 62 carried on slide 54. Carried by slide member 59 is a tool 63, illustrated as a cutting tool, arranged to perform a cutting operation on a workpiece 64. Tool 63 is arranged to be moved with respect to workpiece 64 in accordance with a positioning signal, which may vary with time, supplied by positioning signal source 65. For example, tool 63 may move toward and away from workpiece 64 as carriage 51 moves along base 50 at a predetermined rate.

Servo positioning means are provided for monitoring the positions of each of slides 54 and 59, comparing the actual position with the position commanded by signal source 65 and moving the slides to eliminate any error therebetween.

In this embodiment of the invention a positioning signal supplied by source 65 is applied to motor 58 through an amplifier 66 and a comparator 67. The positioning signal is simultaneously applied to motor 62 through an amplifier 68 and a comparator 69. Means are provided to continuously monitor the position of the slides driven thereby. For example, position sensing means such as selsyn transmitters 70 and 71 are drivably connected to motors 58 and 62, respectively. The term "selsyn" describes a machine well known in the art, having a winding on a first member (rotor) which, when energized with an alternating voltage, induces a voltage in windings in the stator of a magnitude and phase proportional to the displacement of the rotor with respect to a reference position. Upon rotation of the rotor, voltages are induced in the stator windings proportional in magnitude to the position of the rotor with respect to the stator windings. A voltage generated in the stator windings is transmitted to a receiver which may be a second selsyn unit having its rotor blocked, illustrated as selsyn receivers 72 and 73. The voltages induced in the rotors of the selsyn receivers 72 and 73 from the stators by transformer action, vary in magnitude with the displacement of the rotor of the selsyn transmitter and the envelope of the voltages induced in the rotor of the receivers are indicative in magnitude of the displacement of the rotor of the selsyn transmitting units 70 and 71. The voltages induced in the rotors of the selsyn receiving units 72 and 73 are applied to discriminators 74 and 75, respectively, and compared with a reference alternating voltage. The discriminators 74 and 75 then provide an output voltage which varies in magnitude with the position of the rotors of the selsyn transmitting units 70 and 71. Therefore, as the motors 58 and 62 are energized and drive feed screws 56 and 61, respectively, each rotation of the feed screws advances the slides driven thereby a predetermined distance and the selsyn transmitting units 70 and 71, together with associate selsyn receivers and discriminators provide a signal which is indicative of the position of slide members 54 and 59, respectively.

The output signal of discriminator 74 is compared against the positioning signal emanating from signal source 65 in a comparator 69 and the difference therebetween is indicative of any error in the positioning of slide 54, with respect to time. The output signal of comparator 67 is applied to amplifier 66 and hence motor 58 is driven to eliminate the error. The output signal of discriminator 74 is further added to the output signal of discriminator 75 in an adder 76. The net result of the output signals of discriminators 74 and 75 is applied to comparator 67 where it is compared with the positioning signal from positioning signal source 65, and the resulting error signal is applied to motor 62 through amplifier 68. Motor 62 is then driven to eliminate the error resulting from the comparison of the output of adder 76 and the positioning input signal from positioning signal source 65.

The comparators 67 and 69 may be any suitable device which provides an output signal indicative of a difference in two input signals. The comparators may comprise a portion of the associated amplifiers. For example, if amplifiers 66 and 68 are magnetic amplifiers or contain magnetic amplifiers in the input circuits thereof, the signals may be compared to oppositely poled control windings of such magnetic amplifiers. Similarly, adder 76 may comprise any suitable device which yields an output signal indicative of the sum of two input signals. Selsyn discriminators are well known to those skilled in the art.

It will be seen that the positioning input signal from source 65 is applied to motors 58 and 62, simultaneously and motors 58 and 62 and the systems associated therewith act in series to move tool 63 toward or away from the workpiece 64. The operation of the system of FIG. 3 may be mathematically explained in the same manner of the system of FIG. 1, as previously derived, and it may be seen that the overall error of the system is reduced by a factor equal to the reciprocal of the gain of the system comprising amplifier 68, motor 62 and the feedback positioning loop therefor including selsyn transmitter 71, selsyn receiver 73 and discriminator 75.

The selsyn position monitoring systems of FIG. 3 may likewise be utilized to monitor the positions of slides 14 and 20 of FIG. 1 and compare the actual position of slides 14 and 20 with the positions commanded by the sensing elements 32 and 33.

It will be understood that the position sensing selsyns and associated components are to be considered as only exemplary of position sensing servo means that may be utilized in practice of the invention. Moreover, while electrical servo positioning systems have been illustrated and described in disclosing the invention, it will be apparent that a hydraulic or electro-hydraulic servo positioning system may also be utilized in practicing the invention.

Preferred embodiments of the invention which efficiently attain the objects set forth as well as those made apparent have been illustrated and described for purposes of disclosure. However, other embodiments of the invention as well as modifications to the disclosed embodiments may occur to those skilled in the art which do not depart from the spirit and scope of the invention. Accordingly, the appended claims are intended to cover all embodiments and modifications of the invention which do not depart from the spirit and scope of the invention.

What is claimed is:

1. A machine tool system comprising a first member movable toward and away from a workpiece, first controllable drive means for moving said first member, a second member carried by said first member and movable thereon toward and away from a workpiece, second controllable drive means for moving said second member, and means for applying positioning signals to said first and second controllable drive means to produce simultaneous movement of said first and second members to a desired position of said second member.

2. The system of claim 1 wherein said positioning signals are derived from a template tracing means.

3. The system of claim 1 adapted to contour a workpiece proportional to a template and further comprising movable means for tracing the contour of a template, sensing means associated with each of said drive means for simultaneously sensing movement of said movable means and generating a signal proportional thereto, and means for applying the signal generated to the associated drive means.

4. The system of claim 3 wherein each of said members carries a template position sensing means and said means for tracing is arranged to simultaneously produce sensing signals in each of said sensing means.

5. The system of claim 3 wherein each of said sensing means is a linear differential transformer having a movable core and said tracing means simultaneously moves the cores thereof.

6. A machine tool system comprising a first member, a first motor for moving said first member, a second member, said second member being guidably mounted and movable on said first member, a second motor for moving said second member, a tool mounted on said second member arranged to perform a work function on a workpiece, a template tracing element arranged to trace the outline of a template, means responsive to movement of said tracing element for energizing said first motor to produce movement of said first member in accordance with movement of said tracing element, and means responsive to movement of said tracing element for simultaneously energizing said second motor to produce movement of said second member on said first member.

7. A machine tool comprising a first member movable toward and away from a workpiece, first controllable drive means for moving said first member, a second member carried by said first member and movable thereon toward and away from the workpieces, second controllable drive means for moving said second member, means for simultaneously applying a positioning reference signal to said first and second controllable drive means to produce simultaneous movement of said first and second members to a desired position, means responsive to movement of each of said members for producing position servo signals proportional to the movement of each of said members, means for comparing the position reference signal and the position servo signal indicative of the position of said first member and energizing said first drive in proportion to the difference therebetween, and means for adding the position servo signals and comparing the resultant thereof with the reference position signal and energizing said second drive in proportion to the difference therebetween.

8. A machine tool system comprising a first member, a first motor for moving said first member toward and away from a workpiece, a second member, said second member being guidably mounted and movable on said first member, a second motor for moving said second member on said first member toward and away from a workpiece, a tool mounted on said second member arranged to perform a work function on a workpiece, control means for each of said motors effective to energize said motors to drive their respective members, and means for supplying a signal indicative of a desired tool position to each of said control means simultaneously.

9. The system of claim 8 comprising template tracing means, said means for supplying a signal being responsive to motion of said tracing means to generate signals proportional to the degree of motion of said tracing means.

10. The system of claim 9 wherein each of said members carries a means for supplying a signal indicative of a desired tool position and said tracing means is operatively connected to each of said means for supplying a signal.

References Cited by the Examiner

UNITED STATES PATENTS 2,913,648  11/59  Brouwer.

FOREIGN PATENTS 1,114,501  12/55  France.

WILLIAM W. DYER, JR., *Primary Examiner.*

LEON PEAR, *Examiner.*